(12) United States Patent
Toki et al.

(10) Patent No.: US 11,091,212 B2
(45) Date of Patent: Aug. 17, 2021

(54) VEHICULAR AERODYNAMIC DEVICE

(71) Applicant: TOYOTA JIDOSHA KABUSHIKI KAISHA, Aichi-ken (JP)

(72) Inventors: Tatsuya Toki, Toyota (JP); Takahiro Kitamura, Nagoya (JP); Jesse Dwayne Rydell, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 53 days.

(21) Appl. No.: 16/404,956

(22) Filed: May 7, 2019

(65) Prior Publication Data

US 2019/0344837 A1    Nov. 14, 2019

(30) Foreign Application Priority Data

May 9, 2018    (JP) .............................. JP2018-090661

(51) Int. Cl.
| | | |
|---|---|---|
| *B62D 35/00* | (2006.01) | |
| *B62D 35/02* | (2006.01) | |
| *F15D 1/10* | (2006.01) | |
| *H04N 7/18* | (2006.01) | |
| *G01S 15/931* | (2020.01) | |

(52) U.S. Cl.
CPC ......... *B62D 35/001* (2013.01); *B62D 35/005* (2013.01); *B62D 35/007* (2013.01); *B62D 35/008* (2013.01); *B62D 35/02* (2013.01); *F15D 1/10* (2013.01); *G01S 15/931* (2013.01); *G01S 2015/938* (2013.01); *H04N 7/183* (2013.01)

(58) Field of Classification Search
CPC .... B62D 35/001; B62D 35/02; B62D 35/007; B62D 35/008; B62D 35/005; F15D 1/10; H04N 7/183; G01S 15/931; G01S 2015/938
See application file for complete search history.

(56) References Cited

U.S. PATENT DOCUMENTS

| | | | |
|---|---|---|---|
| 10,189,517 B2 * | 1/2019 | Povinelli | ................ B62D 37/02 |
| 2008/0303309 A1 | 12/2008 | Dayton | |
| 2018/0215313 A1* | 8/2018 | Diessner | ................ H04N 7/181 |

FOREIGN PATENT DOCUMENTS

| | | |
|---|---|---|
| JP | S58-98285 U | 7/1983 |
| JP | H7-35268 U | 6/1995 |
| JP | 2003-191873 A | 7/2003 |
| JP | 2007-1545 A | 1/2007 |
| JP | 2016-128296 A | 7/2016 |
| WO | 03/059722 A1 | 7/2003 |

* cited by examiner

*Primary Examiner* — D Glenn Dayoan
*Assistant Examiner* — Melissa Ann Bonifazi
(74) *Attorney, Agent, or Firm* — Hauptman Ham, LLP

(57) ABSTRACT

A vehicular aerodynamic device includes a towing detection unit configured to detect whether a towed vehicle is being towed by a vehicle; a flow adjusting device including a flow adjusting member and being configured such that the flow adjusting member is moved between a retracted position and a deployed position; and a flow adjusting device control unit configured to i) determine whether the towing detection unit detects that the towed vehicle is being towed, ii) determine a kind of the towed vehicle, and iii) control operation of the flow adjusting device in accordance with the determined kind of the towed vehicle or a traveling mode selected through operation performed by an occupant in the vehicle.

20 Claims, 12 Drawing Sheets

VEHICULAR AERODYNAMIC DEVICE

INCORPORATION BY REFERENCE

The disclosure of Japanese Patent Application No. 2018-090661 filed on May 9, 2018 including the specification, drawings and abstract is incorporated herein by reference in its entirety.

BACKGROUND

1. Technical Field

The disclosure relates to a vehicular aerodynamic device.

2. Description of Related Art

Japanese Patent Application Publication No. 2016-128296 (JP 2016-128296 A) discloses a coupling structure for coupling a towing vehicle and a towed vehicle to each other so that the towing vehicle tows the towed vehicle (a trailer). More specifically, a towing hitch and a wheel are disclosed. The towing hitch is provided in the towed vehicle. The towing hitch can be folded when the towing hitch is turned toward a vehicle rear side while being disconnected from the towing vehicle. The wheel is provided so as to be able to come into contact with a road surface when the towing hitch is disconnected from the towing vehicle. Thus, the towing hitch that is folded after being disconnected from the towing vehicle, and the wheel can be disposed at a position where they are overlapped with each other in a vehicle up-down direction. Therefore, it is possible to reduce an occupation space on the road surface, which is occupied by the towed vehicle in a stopped state.

SUMMARY

However, the coupling structure described in JP 2016-128296 A is provided between the towed vehicle and the towing vehicle, and thus, a certain clearance is formed therebetween. Therefore, a traveling wind flowing along an upper side of the towing vehicle flows into a clearance between the towed vehicle and the towing vehicle where the coupling structure is provided. In particular, in the case where the towed vehicle has substantially the same total height as that of the towing vehicle, the traveling wind (air) that has flowed into the clearance hits a front portion of the towed vehicle, and flows down toward a vehicle lower side. Part of the air that has thus flowed down flows into areas under floors of the towed vehicle and the towing vehicle. Thus, the pressure at a back surface of the towing vehicle falls, and the air resistance applied to the towing vehicle increases. Furthermore, a lift force is produced on the towing vehicle due to the flow of air into the area under the floor of the vehicle from the vehicle rear side, and thus, the operating stability of the towing vehicle may be lowered. In view of the above, there is room for improvement in reducing the air resistance applied to the vehicle when the vehicle travels alone, and reducing the air resistance applied to the vehicle also when the vehicle tows the towed vehicle.

The disclosure provides a vehicular aerodynamic device that reduces air resistance applied to a vehicle when the vehicle travels alone, and reduces the air resistance applied to the vehicle also when the vehicle tows a towed vehicle.

An aspect of the disclosure relates to a vehicular aerodynamic device including a towing detection unit that is provided in a vehicle configured to tow a towed vehicle, the towing detection unit being configured to detect whether the towed vehicle is being towed by the vehicle; a flow adjusting device that is provided on a lower side of the vehicle, and includes a flow adjusting member, the flow adjusting device being configured such that the flow adjusting member is moved between a retracted position where the flow adjusting member is retracted toward an inner side of the vehicle and a deployed position where the flow adjusting member is deployed toward an outer side of the vehicle; and a flow adjusting device control unit configured to i) determine whether the towing detection unit detects that the towed vehicle is being towed, ii) determine a kind of the towed vehicle, and iii) control operation of the flow adjusting device in accordance with the determined kind of the towed vehicle or a traveling mode selected through operation performed by an occupant in the vehicle.

According to the aspect, the towing detection unit that is provided in the vehicle configured to tow the towed vehicle detects whether the towed vehicle is being towed. The flow adjusting device control unit determines whether the towing detection unit detects that the towed vehicle is being towed. In other words, the flow adjusting device control unit determines whether the towed vehicle is being towed, based on whether the towing detection unit detects that the towed vehicle is being towed. When the towing detection unit detects that the towed vehicle is being towed, the flow adjusting device control unit determines the kind of the towed vehicle, and controls the operation of the flow adjusting device that is provided on the lower side of the vehicle in accordance with the determined kind of the towed vehicle or the traveling mode selected through the operation performed by the occupant in the vehicle. When the flow adjusting member is retracted in an inner side of the vehicle, a traveling wind is urged to flow into an area under a floor of the vehicle. Therefore, the traveling wind that has flowed into the area under the floor of the vehicle flows out toward a rear side of the vehicle from an area under the floor of a rear portion of the vehicle, and pushes up the air flowing down toward the lower side of the vehicle after hitting a front side of the towed vehicle, toward a vehicle upper side. Thus, the pressure toward a vehicle front side on a vehicle back surface rises, and thus, the air resistance applied to the vehicle is reduced. Examples of "the kind of the towed vehicle" include a towed vehicle with a high total height such as a camping trailer or a cargo trailer, and a towed vehicle with a low total height such as a boat trailer.

According to the aspect, when the flow adjusting member is deployed toward the outer side of the vehicle, the traveling wind is restrained from flowing into the area under the floor of the vehicle. For example, in the case where a vehicle with a high vehicle height, such as a pickup truck, travels alone at high speed, the flow of air is disturbed by a structure under the floor of the vehicle when the traveling wind flows into the area under the floor of the vehicle. Therefore, the air resistance applied to the vehicle may increase. Since the flow adjusting member is deployed toward the outer side of the vehicle, and the traveling wind is restrained from flowing into the area under the floor of the vehicle, the flow of air is guided toward the vehicle upper side. Accordingly, the flow of air under the floor of the vehicle is restrained from being disturbed, and the flow of air on the vehicle back surface is improved. Thus, the air resistance applied to the vehicle can be reduced when the vehicle travels alone, and the air resistance applied to the vehicle can be reduced also when the vehicle tows the towed vehicle.

The vehicular aerodynamic device according to the aspect has an excellent effect of reducing the air resistance applied to the vehicle when the vehicle travels alone, and reducing the air resistance applied to the vehicle also when the vehicle tows the towed vehicle.

In the above-described aspect, the flow adjusting device control unit may be configured to control the operation of the flow adjusting device in accordance with a vehicle speed of the vehicle.

In the above-described configuration, the flow adjusting device control unit can control the operation of the flow adjusting device in accordance with the vehicle speed of the vehicle. Therefore, in the case where a sufficient aerodynamic effect is not obtained by the flow adjusting device due to traveling at low speed as in the case of traveling on a rough road, the flow adjusting member is retracted in the inner side of the vehicle, and thus, the vehicular aerodynamic device can be prevented from being damaged by an obstacle such as a curbstone. Thus, the flow adjusting member can be controlled to be retracted or deployed in accordance with the traveling state.

The vehicular aerodynamic device configured as described above has an excellent effect of controlling the flow adjusting member such that the flow adjusting member is retracted or deployed in accordance with the traveling state.

In the above-described aspect, the flow adjusting device may include a front spoiler device that is disposed on a lower side of a front portion of the vehicle. The front spoiler device may include a spoiler link portion having one end portion that is turnably attached to the vehicle; a stay portion disposed such that a longitudinal direction of the stay portion is a vehicle width direction, the stay portion being attached to another end portion of the spoiler link portion, and the stay portion being provided to extend along the vehicle width direction; and a flare portion that serves as the flow adjusting member and is attached to the stay portion along the longitudinal direction of the stay portion, the flare portion being in a form of a substantially flat plate disposed to extend along a vehicle up-down direction in a vehicle front view between a lower end portion of a front bumper cover of the vehicle in the vehicle up-down direction and a road surface when the flare portion is in a deployed state.

In the above-described configuration, the flare portion is provided on the lower side of the front bumper cover in the vehicle up-down direction and extends in the vehicle width direction. When the flare portion is deployed, the flare portion is in the form of a substantially flat plate in the vehicle front view. When the flare portion is deployed, the flare portion restrains air from flowing into the area under the floor of the vehicle from an area under the front bumper cover. On the other hand, when the flare portion is retracted, the flare portion is accommodated in the inner side of the vehicle, and thus, the traveling wind is urged to flow into the area under the floor of the vehicle. Thus, the air resistance applied to the vehicle can be reduced when the vehicle travels alone, and the air resistance applied to the vehicle can be reduced also when the vehicle tows the towed vehicle.

The vehicular aerodynamic device configured as described above has an effect of reducing the air resistance applied to the vehicle when the vehicle travels alone, and reducing the air resistance applied to the vehicle also when the vehicle tows the towed vehicle, because the front spoiler device is provided on the lower side of the front bumper cover of the vehicle in the vehicle up-down direction.

In the above-described aspect, the flow adjusting device may include a side step device that is disposed to extend along a vehicle front-rear direction on a lower side of a lateral portion of the vehicle. The side step device may include a front link portion disposed such that a longitudinal direction of the front link portion is a vehicle width direction, the front link portion being provided to extend along the vehicle width direction in a front side of the vehicle, and the front link portion having one end portion that is turnably attached to the lateral portion of the vehicle; a rear link portion disposed such that a longitudinal direction of the rear link portion is the vehicle width direction, the rear link portion being provided to extend along the vehicle width direction in a rear side of the vehicle, and the rear link portion having one end portion that is turnably attached to the lateral portion of the vehicle; a step portion that is provided to extend along the vehicle front-rear direction, the step portion being attached to another end portion of the front link portion and another end portion of the rear link portion, and the step portion being configured to be raised and lowered in a vehicle up-down direction; and a lateral wall portion that serves as the flow adjusting member and is provided between a rear side of the front link portion in the vehicle front-rear direction and a front side of the rear link portion in the vehicle front-rear direction, the lateral wall portion being disposed to extend along the vehicle up-down direction in a vehicle lateral view between the lateral portion of the vehicle and the step portion when the lateral wall portion is in a deployed state.

In the above-described configuration, the step portion is attached to the front link portion and the rear link portion and is configured to be raised and lowered, and when the step portion is lowered toward the vehicle lower side, the lateral wall portion that is disposed so as to close the space between the step portion and the lateral portion of the vehicle is deployed toward the road surface from the lower side of the lateral portion of the vehicle. Therefore, air is restrained from flowing into the area under the floor of the vehicle from an area outside the lateral portion of the vehicle. On the other hand, when the lateral wall portion is retracted, the lateral wall portion is accommodated in the inner side of the vehicle, and thus, the traveling wind is urged to flow into the area under the floor of the vehicle. Thus, the air resistance applied to the vehicle can be reduced when the vehicle travels alone, and the air resistance applied to the vehicle can be reduced also when the vehicle tows the towed vehicle.

The vehicular aerodynamic device configured as described above has an effect of reducing the air resistance applied to the vehicle when the vehicle travels alone, and reducing the air resistance applied to the vehicle also when the vehicle tows the towed vehicle, because the side step device is disposed to extend along the vehicle front-rear direction on the lower side of the lateral portion of the vehicle.

In the above-described aspect, the flow adjusting device may include an opening portion that is provided to extend along a vehicle width direction in a lower side of a front bumper cover of the vehicle in a vehicle up-down direction, the opening portion being opened toward a front side of the vehicle, and the flow adjusting device may further include a grille shutter device that is disposed behind the front bumper cover of the vehicle in a vehicle front-rear direction. The grille shutter device may include a shutter portion that serves as the flow adjusting member, the shutter portion being disposed behind the opening portion in the vehicle front-rear direction and extending along the vehicle up-down direction in a vehicle front view so as to close the opening portion when the shutter portion is in a deployed state; and a shutter link portion having one end portion that is coupled to the shutter portion, and having another end portion that is turnably attached to the vehicle.

In the above-described configuration, the shutter portion is disposed behind the opening portion in the vehicle front-rear direction, and is provided so as to close the opening portion from the inner side of the vehicle when the shutter portion is deployed. When the shutter portion is deployed, the shutter portion restrains air from flowing into the area under the floor of the vehicle from the opening portion. On the other hand, when the shutter portion is retracted, the shutter portion is accommodated in the inner side of the vehicle, and thus, the traveling wind is urged to flow into the area under the floor of the vehicle. Thus, the air resistance applied to the vehicle can be reduced when the vehicle travels alone, and the air resistance applied to the vehicle can be reduced also when the vehicle tows the towed vehicle.

The vehicular aerodynamic device configured as described above has an effect of reducing the air resistance applied to the vehicle when the vehicle travels alone, and reducing the air resistance applied to the vehicle also when the vehicle tows the towed vehicle, because the grille shutter device is provided behind the front bumper cover of the vehicle in the vehicle front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
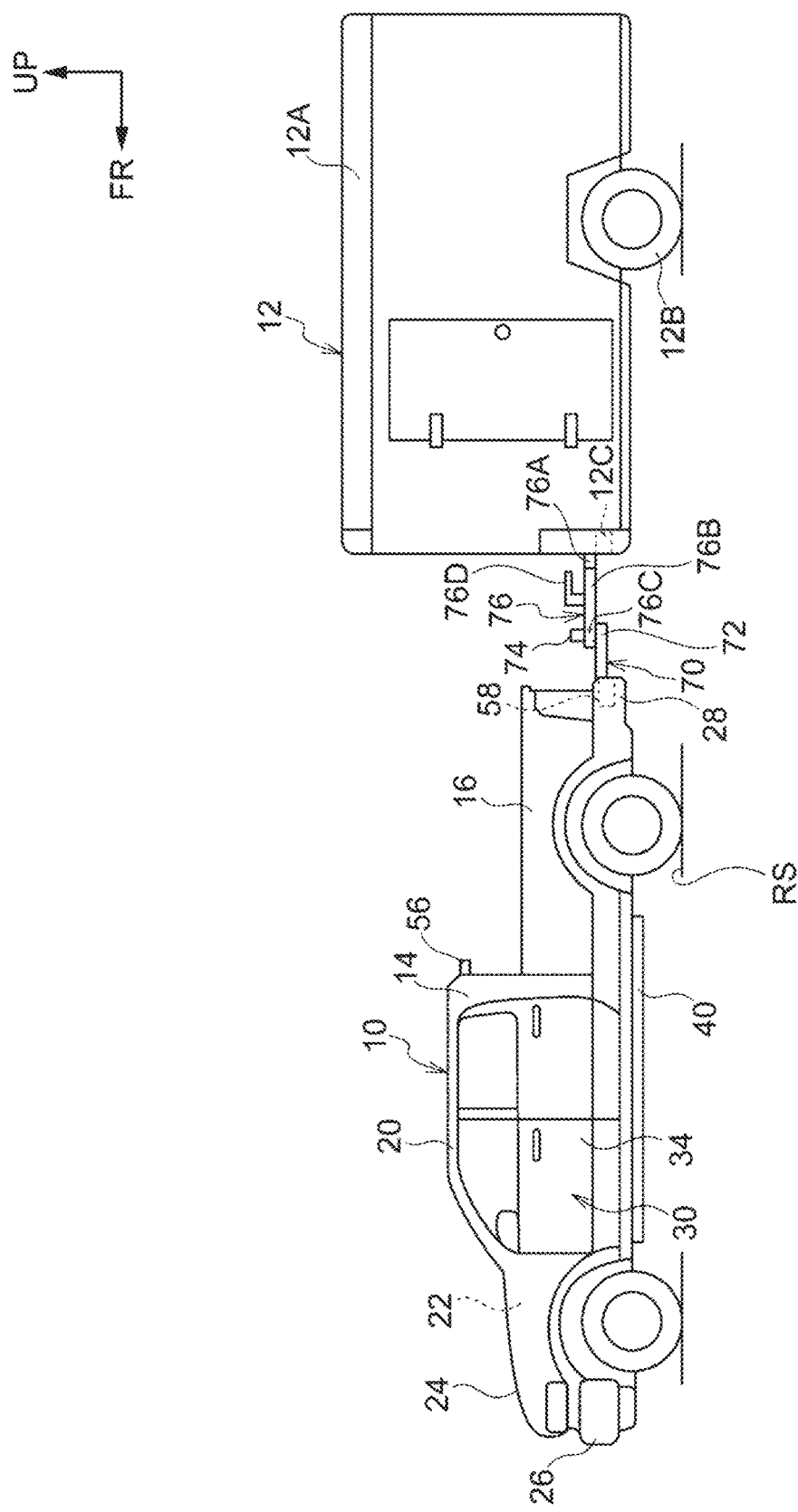
FIG. 1 is a lateral view of a pickup truck that is provided with a vehicular aerodynamic device according to a first embodiment, and that tows a trailer.

A vehicular aerodynamic device according to a first embodiment of the disclosure will be described hereinafter through the use of FIGS. 1 to 10. In the drawings referred to hereinbelow, a vehicle front side (a front side) is denoted by an arrow FR, an inner side in a vehicle width direction is denoted by an arrow IN, and a vehicle upper side (upper side) is denoted by an arrow UP. It should be noted herein that a right side and a left side at a time when an occupant is directed toward the vehicle front side are defined as "a vehicle right side" and "a vehicle left side", respectively. Further, "an upper portion (an upper side)" and "a lower portion (a lower side)" respectively signify "an upper portion (an upper side)" and "a lower portion (a lower side)" in a vehicle up-down direction (a vehicle height direction), and "a front portion (a front side)" and "a rear portion (a rear side)" respectively signify "a front portion (a front side)" and "a rear portion (a rear side)" in a vehicle front-rear direction. Further, "above" and "below" respectively signify "above" and "below" in the vehicle up-down direction, and "ahead of" and "behind" respectively signify "ahead of" and "behind" in the vehicle front-rear direction.

Configuration of Pickup Truck

FIG. 1 is a lateral view of a pickup truck 10 that is provided with the vehicular aerodynamic device according to the present embodiment. A trailer 12 as a towed vehicle is coupled to a rear side of the pickup truck 10. The configurations of the pickup truck 10 and the trailer 12 according to the present embodiment are bilaterally symmetric. Therefore, in the following description, the configurations on the vehicle left side shown in FIGS. 1 to 10 will be described, and the description of the vehicle right side will be omitted.

The pickup truck 10 is configured to include a cabin 14 that is disposed at an intermediate portion in the vehicle front-rear direction, and a load-carrying platform 16 that is provided behind the cabin 14. A floor panel 18 (see FIG. 5) is disposed below the cabin 14, and a roof panel 20 is disposed above the cabin 14. A side door 30 is disposed on the side of the cabin 14 in the vehicle width direction, and is attached to the cabin 14 such that the side door 30 is opened and closed.

The side door 30 is configured to include a door outer panel 34 that is disposed at an outer side in the vehicle width direction, and a door inner panel 36 (see FIG. 5) that is disposed inward of the door outer panel 34 in the vehicle width direction. A peripheral edge portion of the door outer panel 34 other than an upper edge portion thereof and a peripheral edge portion of the door inner panel 36 other than an upper edge portion thereof are hemmed (i.e., are subjected to a hemming process). Thus, the door panels of the side door 30 are provided to have a closed cross-sectional structure (see FIG. 5).

A side step device 40 configured such that an occupant places his or her feet on the side step device 40 when getting on and off the cabin 14 is provided below the side door 30. As will be described later, the side step device 40 can be raised and lowered in the vehicle up-down direction depending on whether the towed vehicle is being towed, the type (kind) of the towed vehicle, and the vehicle speed, when the pickup truck 10 travels.

An engine room 22 is provided ahead of the cabin 14, and an engine hood 24 is disposed above the engine room 22 such that the engine hood 24 is opened and closed. An undercover 25 is provided below the engine room 22 (see FIG. 3).

A front bumper cover 26 is attached to a front end portion of the pickup truck 10. The front bumper cover 26 has the shape of a curved plate protruding forward as a whole, and a surface (an outer surface) of the front bumper cover 26 is a design surface.

Figure 2:
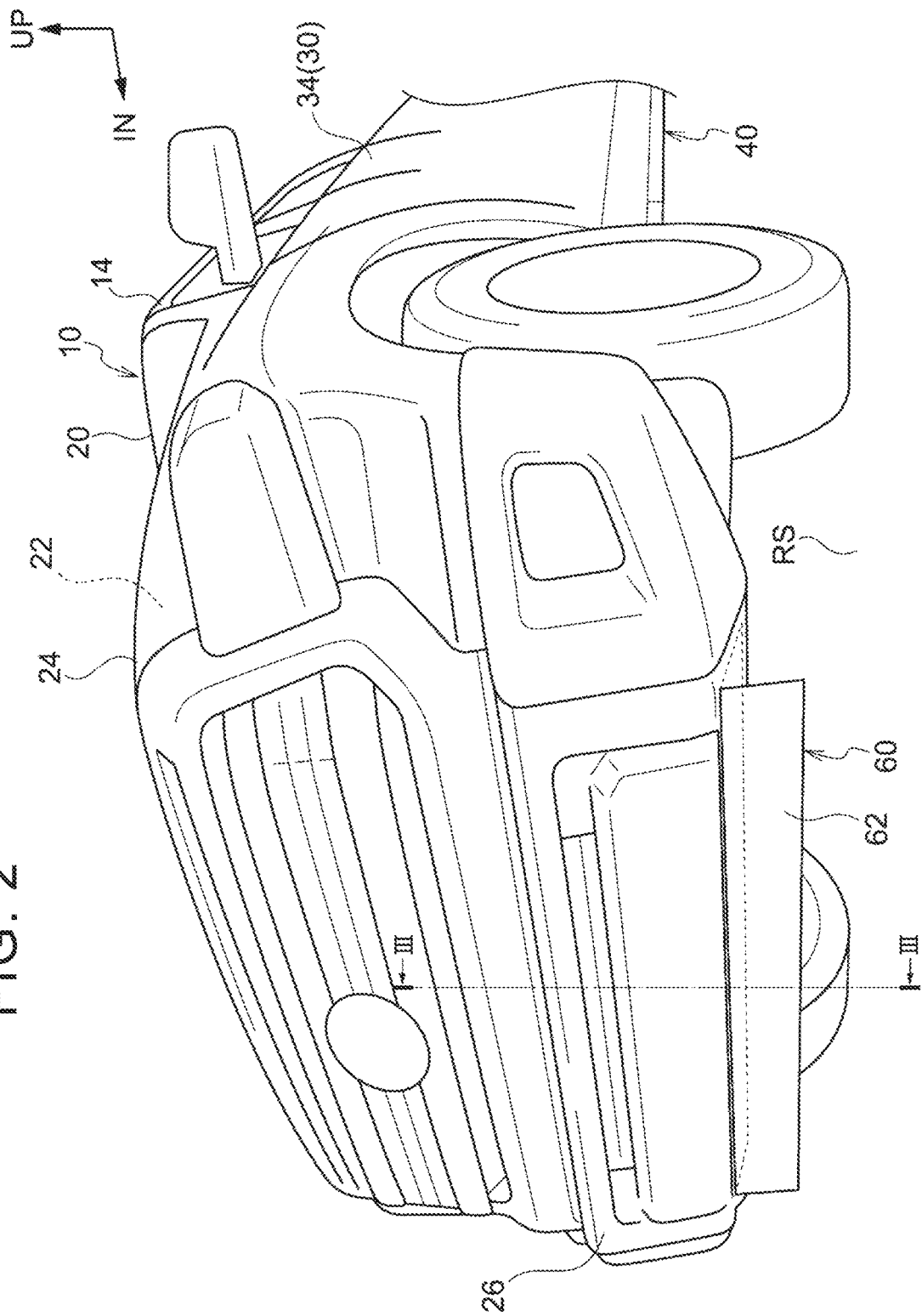
FIG. 2 is a perspective view of a front spoiler device as a flow adjusting device according to the first embodiment as viewed from a vehicle front side.

As shown in FIG. 2, a front spoiler device 60 that is provided to extend along the vehicle width direction is disposed on a lower end portion of the front bumper cover 26. As will be described later, the front spoiler device 60 includes a flare portion 62 that can be turned forward (toward the front side).

As shown in FIG. 1, an onboard camera 56 as a towing detection unit configured to capture an image of a scene behind the pickup truck 10 is provided at a rear portion of the cabin 14. Image information acquired by the onboard camera 56 is also used to determine the kind of (type of) the towed vehicle, as will be described later. A clearance sonars 58 are disposed on a reverse side (a front side) of a rear bumper 28 at a rear portion of the pickup truck 10. The clearance sonars 58 serve as towing detection units configured to measure a distance to a barrier at the time of parking such as parallel parking or parking in a garage. Distance information acquired by the clearance sonars 58 can be also used to determine the kind of the towed vehicle, as will be described later.

A towing portion 70 is provided so as to be removable from the pickup truck 10. The towing portion 70 is disposed at a lower portion of the rear portion of the pickup truck 10. The towing portion 70 is configured to include a towing bracket 72 that extends rearward from the lower portion of the rear portion of the pickup truck 10, and a towing pin 74 that protrudes toward the upper side from a rear end portion of the towing bracket 72.

Configuration of Trailer

The trailer 12 is coupled to the rear side of the pickup truck 10. The trailer 12 is a camping trailer-type towed vehicle that is configured to include a trailer vehicle body portion 12A that is coupled to the towing portion 70 of the pickup truck 10 via a towing hitch 76, and a wheel portion 12B that is provided at a substantially central portion, in the vehicle front-rear direction, of a lower portion of the trailer vehicle body portion 12A.

The towing hitch 76 configured to be coupled to the pickup truck 10 is provided on a lower side of a front portion of the trailer vehicle body portion 12A. A base portion 76A is provided in a rear side of the towing hitch 76. The base portion 76A extends along the vehicle width direction of the trailer 12 at a lower portion of the front portion of the trailer vehicle body portion 12A. The base portion 76A is turnably attached to the trailer vehicle body portion 12A. The towing hitch 76 is formed to have a substantially triangle shape in a plan view, and includes a right inclined portion (not shown) and a left inclined portion (not shown) that are joined to the base portion 76A. The right inclined portion extends toward a position that is located ahead of the trailer 12 and at a center in the vehicle width direction from a right end portion of the base portion 76A in the vehicle width direction, and the left inclined portion extends toward the position that is located ahead of the trailer 12 and at the center in the vehicle width direction from a left end portion of the base portion 76A in the vehicle width direction.

An engagement bracket 76B is provided so as to extend in the vehicle front-rear direction from a substantially central portion of the base portion 76A in the vehicle width direction to a joint portion between the right inclined portion and the left inclined portion, the joint portion being located ahead of the base portion 76A. The engagement bracket 76B is configured to include an engagement portion 76C and a cancellation lever 76D. In a front side of the engagement portion 76C, an insertion hole for coupling the engagement bracket 76B to the towing portion 70 of the pickup truck 10 is provided. The cancellation lever 76D is attached to a rear side of the engagement portion 76C.

The engagement portion 76C is removably coupled to the towing portion 70 by being fitted to the towing pin 74 of the pickup truck 10 from an upper side of the trailer 12. The coupling between the engagement portion 76C and the towing pin 74 can be cancelled (i.e., the engagement portion 76C and the towing pin 74 can be disconnected from each other) by holding the cancellation lever 76D and pulling it up toward the upper side of the trailer 12.

A connector portion 12C is disposed in the lower side of the front portion of the trailer vehicle body portion 12A. In the connector portion 12C, a connector of a cable for a brake of the trailer 12 and a connector of a cable for a lamp of the trailer 12 are disposed. The connector portion 12C is connected to a connector (not shown) in the pickup truck 10 via a cable (not shown) that is disposed to extend along the towing hitch 76 and the towing portion 70. The connector in the pickup truck 10 is connected to an ECU 80 (see FIG. 3) as a towing detection unit that will be described later. Thus, the pickup truck 10 is electrically connected to a controller for the brake of the trailer 12 and the lamp of the trailer 12.

Configuration of Front Spoiler

As shown in FIG. 2, the front spoiler device 60 as a flow adjusting device is disposed on the lower end portion of the front bumper cover 26. The front spoiler device 60 is attached to a lower end portion of a bumper reinforcement (not shown). The front spoiler device 60 extends in the vehicle width direction along a lower portion of the bumper reinforcement.

Figure 3:
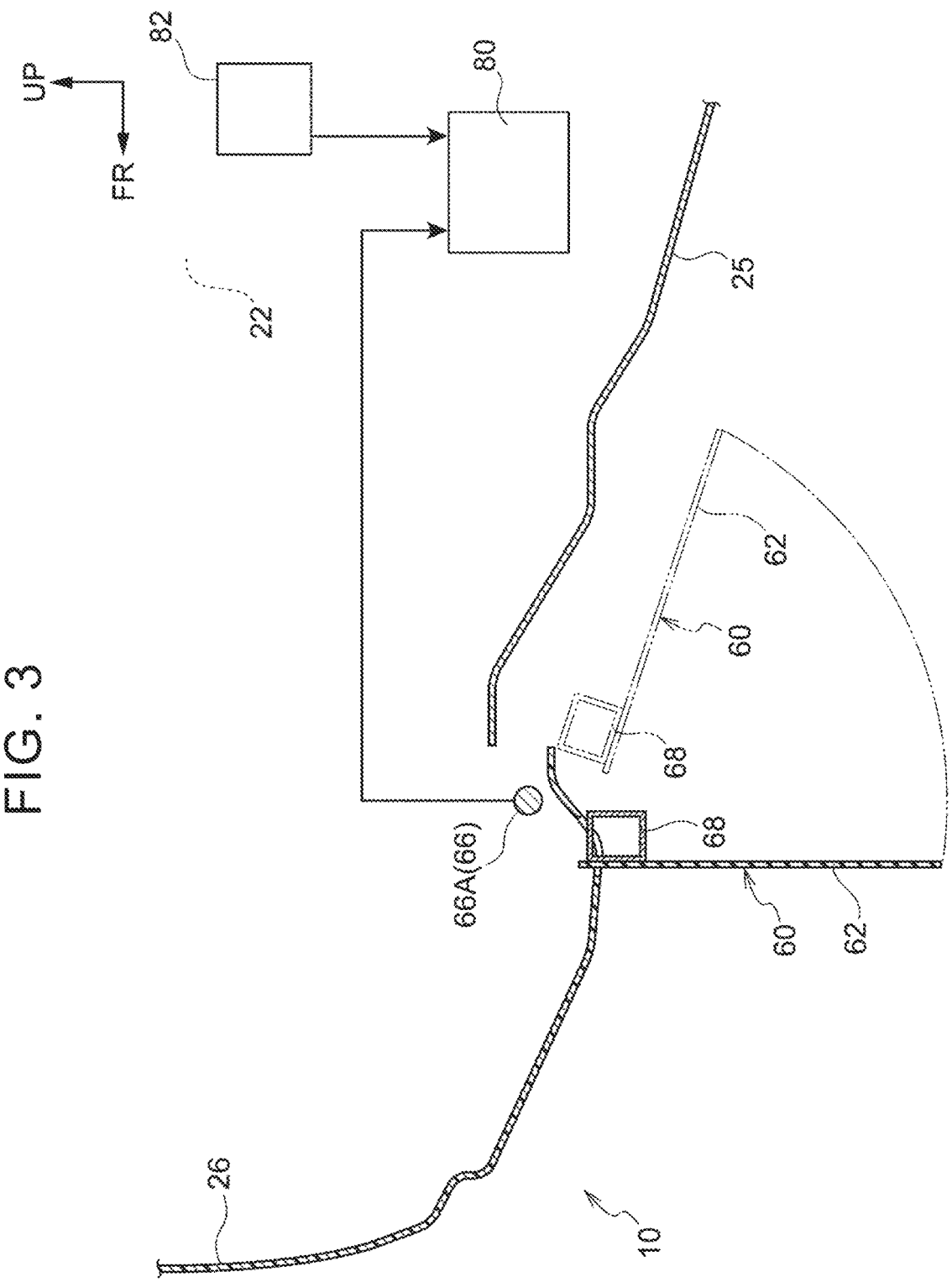
FIG. 3 is a vertical sectional view showing a state where the front spoiler device shown in FIG. 2 is cut along a line of FIG. 2.

As shown in FIG. 3, a spoiler link portion 66 including a spoiler shaft 66A that extends in the vehicle width direction is provided in an upper side of the front spoiler device 60. A link plate (not shown) is attached to a lower side of the spoiler shaft 66A such that the link plate turns integrally with the spoiler shaft 66A.

A stay portion 68 is fixed to a lower end portion of the link plate. The stay portion 68 extends in the vehicle width direction, and is formed of a metal hollow material. An upper end portion of the flare portion 62 as a flow adjusting member is joined to a lateral surface of the stay portion 68. The flare portion 62 is made of rubber and is in the form of a substantially flat plate. When retracted at a retracted position (a position indicated by an alternate long and two short dashes line in FIG. 3), the flare portion 62 extends in the substantially vehicle front-rear direction along the lower end portion of the front bumper cover 26 in a vehicle lateral view.

When the flare portion 62 is deployed, the spoiler shaft 66A is turned by a motor (not shown), and thus, the stay portion 68 and the flare portion 62 are turned forward (toward the front side) to a deployed position (a position indicated by a solid line in FIG. 3). The deployed flare portion 62 is disposed to extend along the vehicle up-down direction in a vehicle front view between the lower end portion of the front bumper cover 26 of the pickup truck 10 and a road surface RS (see FIG. 2).

In the embodiment, the flare portion 62 has a substantially flat plate shape, and extends in the vehicle width direction. However, the structure of the flare portion 62 is not limited to the structure in the embodiment. In the case where the design surface of the front bumper has a curved shape such that a central portion of the front bumper in a plan view protrudes forward, the flare portion 62 may be curved so as to match the curved shape of the design surface of the front bumper.

Configuration of Side Step Device

Figure 4:
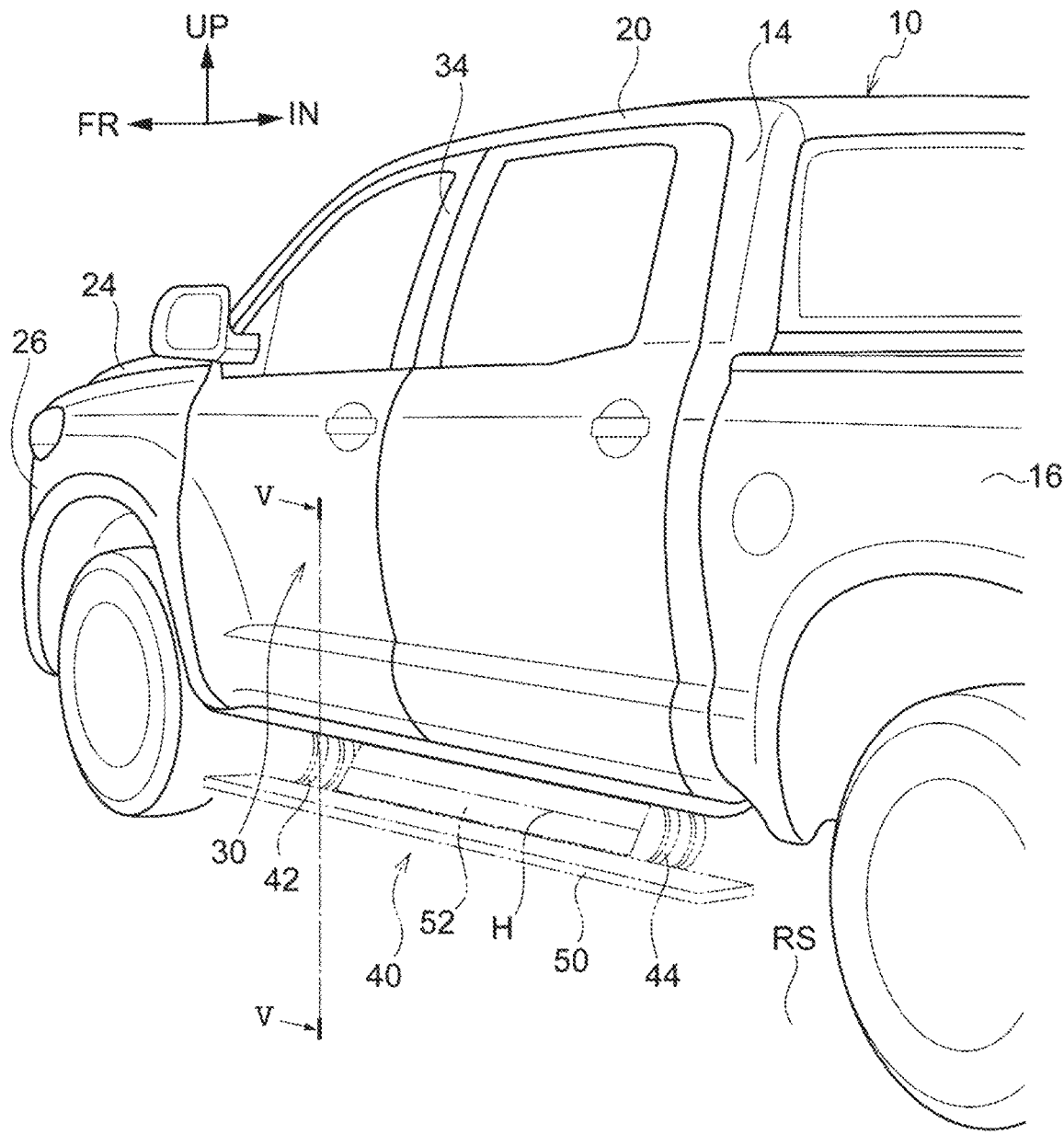
FIG. 4 is a perspective view of a side step device as a flow adjusting device according to the first embodiment when viewed from a vehicle lateral surface.

As shown in FIG. 4, the side step device 40 as a flow adjusting device is provided below the side door 30, and extends along the vehicle front-rear direction. A front link portion 42 having a four-joint link mechanism (not shown) and made of metal is disposed in an inner side, in the vehicle width direction, of a front portion of the side step device 40. A rear link portion 44 having a four-joint link mechanism (not shown) and made of metal is disposed in an inner side, in the vehicle width direction, of a rear portion of the side step device 40.

Figure 5:
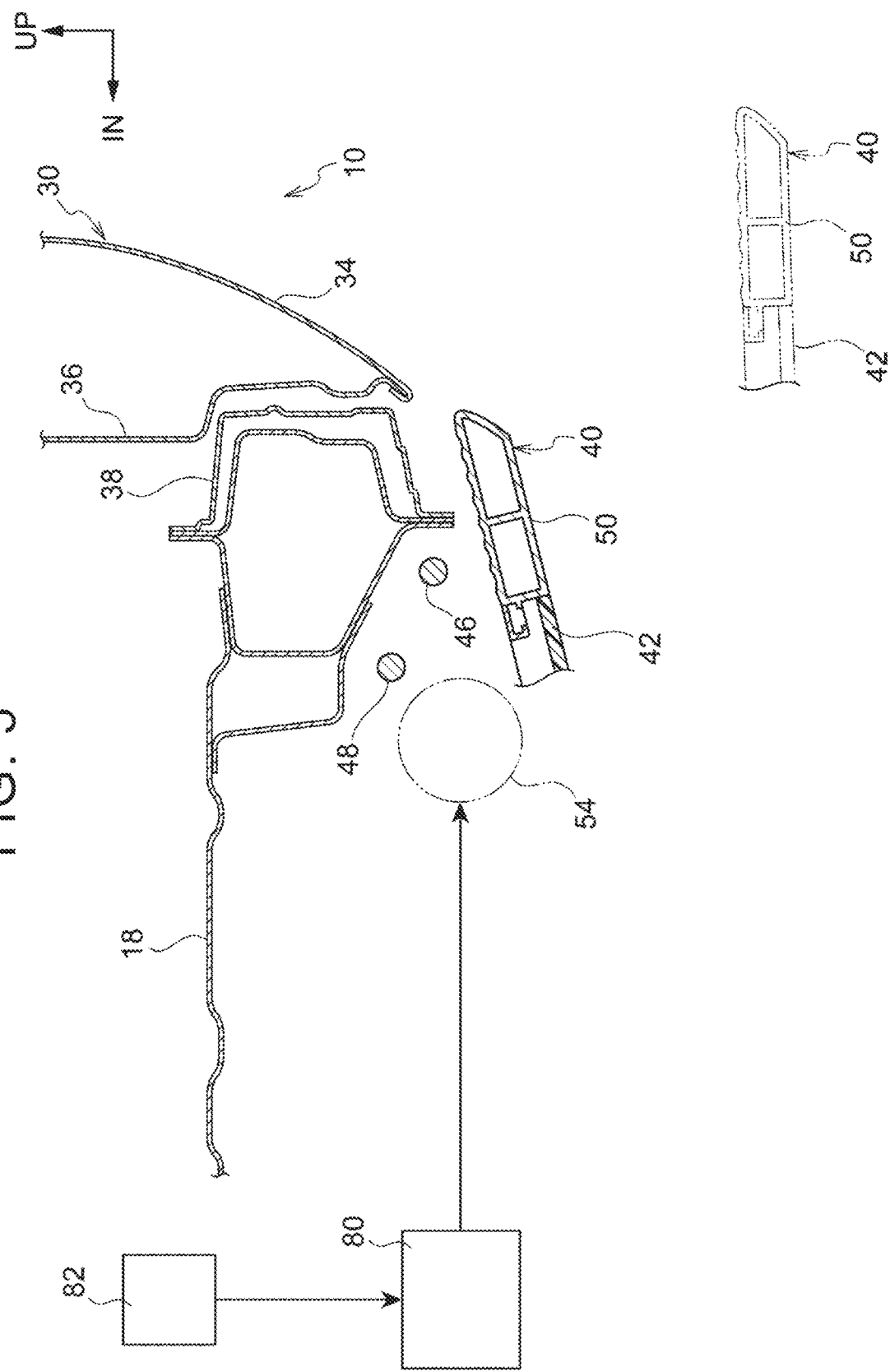
FIG. 5 is a vertical sectional view showing a state where the side step device shown in FIG. 4 is cut along a line V-V of FIG. 4.

As shown in FIG. 5, an outer shaft portion 46 that extends in the vehicle front-rear direction is disposed below a rocker 38 that is provided at each lateral portion of the floor panel 18 of the pickup truck 10 in the vehicle width direction. An inner shaft portion 48 that extends in the vehicle front-rear direction is disposed inward of the outer shaft portion 46 in the vehicle width direction. The outer shaft portion 46 and the inner shaft portion 48 are coupled to a motor 54 via gears (not shown).

An upper end portion of the four-joint link mechanism of the front link portion 42 is attached so as to turn integrally with the outer shaft portion 46 and the inner shaft portion 48. As is the case with the front link portion 42, an upper end portion of the four-joint link mechanism of the rear link portion 44 is attached so as to turn integrally with the outer shaft portion 46 and the inner shaft portion 48.

A plate-shaped step portion 50 that is formed of a metal hollow material and that extends along the vehicle front-rear direction is attached to lower end portions of the front link portion 42 and the rear link portion 44, the lower end portions being located at the outer side in the vehicle width direction. The step portion 50 has a substantially rectangular shape in a plan view, and is used such that the occupant can place his or her feet on the step portion 50 when getting on and off the cabin 14.

The outer shaft portion 46 and the inner shaft portion 48 are rotated around an axis in synchronization with each other, by driving the motor 54. Thus, the front link portion 42 and the rear link portion 44 are turned in the vehicle width direction, and the step portion 50 can move in the vehicle up-down direction between a retracted position (a position indicated by a solid line in FIG. 5) and a deployed position (a position indicated by an alternate long and two short dashes line in FIGS. 4 and 5).

A lateral wall portion 52 as a flow adjusting member is disposed between the front link portion 42 and the rear link portion 44 and between a lateral portion of the pickup truck 10 and the step portion 50 such that the lateral wall portion 52 closes a region surrounded by these portions (i.e., the front link portion 42, the rear link portion 44, a lateral portion of the pickup truck 10, and the step portion 50). The lateral wall portion 52 is formed of two plates that are coupled to each other at a substantially intermediate portion of the lateral wall portion 52 in the vehicle width direction by a hinge portion H. When the step portion 50 is retracted, the lateral wall portion 52 is retracted such that the two plates are overlaid on each other in accordance with the turning of the front link portion 42 and the rear link portion 44. When the step portion 50 is deployed, the lateral wall portion 52 is deployed such that the two plates close a space between a rear side of the front link portion 42 and a front side of the rear link portion 44 in the vehicle lateral view in accordance with the turning of the front link portion 42 and the rear link portion 44.

In the embodiment, the lateral wall portion 52 is configured such that the two plates are coupled to each other by the hinge. However, the structure of the lateral wall portion 52 is not limited to the structure in the embodiment. A foldable sailcloth or the like may be disposed between the lateral portion of the pickup truck 10 and the step portion 50.

As shown in FIGS. 3 and 5, the front spoiler device 60 and the side step device 40 are electrically connected to an electronic control unit (ECU) 80 as a flow adjusting device control unit provided in the pickup truck 10. The ECU 80 is also electrically connected to a vehicle speed sensor 82 provided in the pickup truck 10, and the connector portion 12C of the trailer 12.

Furthermore, the ECU 80 is electrically connected to the onboard camera 56 that is provided at the rear portion of the cabin 14, and the clearance sonars 58 that are disposed on the reverse side (the front side) of the rear bumper 28. The ECU 80 is set so as to be able to determine whether there is a towed vehicle such as the trailer 12, and to determine the kind of the towed vehicle, based on image data acquired from the onboard camera 56. The ECU 80 is set so as to be able to identify a total vehicle height and a vehicle width of the towed vehicle, and to determine the kind of the towed vehicle, based on signals acquired from the plurality of the clearance sonars 58 that are disposed at a plurality of positions in the vehicle up-down direction and the vehicle width direction.

Next, the operation and effects of the present embodiment will be described through the description of a flowchart in FIG. 6 that shows the control of the flow adjusting devices 40 and 60 of the vehicular aerodynamic device according to the present embodiment.

In step 110, a vehicle speed of the pickup truck 10 is detected by the vehicle speed sensor 82 that is disposed in the pickup truck 10. Subsequently, in step 112, image information behind the pickup truck 10 is acquired by the onboard camera 56.

Subsequently, in step 114, the ECU 80 determines whether the flare portion 62 of the front spoiler device 60 has been deployed toward the outer side of the pickup truck 10 (hereinafter referred to as "a deployed state"). More specifically, a rotational angle of the spoiler shaft 66A, which turns the flare portion 62 of the front spoiler device 60, is calculated based on an output of an angle sensor (not shown) that is coupled to the spoiler shaft 66A. Thus, the ECU 80 determines whether the flare portion 62 of the front spoiler device 60 is in the deployed state or has been retracted in an inner side of the pickup truck 10 (hereinafter referred to as "a retracted state"). When the flare portion 62 is in the deployed state, the control shifts to step 116. When the flare portion 62 is in the retracted state, the control shifts to step 118.

In step 116, the ECU 80 determines whether the total height of the trailer 12 is high. As a concrete procedure, the ECU 80 first determines, based on the image information acquired by the onboard camera 56, whether the towed vehicle is being towed. When the ECU 80 determines that the pickup truck 10 is towing the towed vehicle (the trailer 12), the kind of the towed vehicle is then determined based on the image information acquired by the onboard camera 56. More specifically, the ECU 80 determines whether the pickup truck 10 is towing a towed vehicle with a high total height such as the camping trailer-type trailer 12 or a cargo trailer, is towing a towed vehicle with a relatively low total height for transporting a boat or a motorbike, or is in a single traveling state where no towed vehicle is being towed. When the ECU 80 determines that the pickup truck 10 is towing the trailer 12 with a high total height, the control shifts to step 126. On the other hand, when the ECU 80 determines that the pickup truck 10 is towing the towed vehicle with a relatively low total height or is in the single traveling state, the control shifts to step 124.

In the embodiment, it is determined, based on the image information acquired by the onboard camera 56, whether the towed vehicle is being towed. However, the disclosure is not limited to the control in the embodiment. It may be determined whether the towed is being towed, based on distance information acquired by the clearance sonars 58, or according to whether the ECU 80 has detected that there is conduction between the pickup truck 10 and the controller for the brake of the trailer 12.

In the embodiment, the ECU 80 determines the kind of the towed vehicle based on the image information acquired by the onboard camera 56. However, the disclosure is not limited to the control in the embodiment. It may be determined, through the use of the plurality of the clearance sonars 58 that are disposed on the reverse side of the rear bumper 28, whether the towed vehicle is a trailer that is lower in total height and narrower in vehicle width than the camping-type trailer 12 or the like. Examples of a trailer that is lower in total height and narrower in vehicle width than the camping-type trailer 12 or the like include a boat trailer for transporting a small boat and a flat-floor trailer for transporting a motorbike. Furthermore, instead of these determinations, the following determination may be performed. That is, a switch for selecting a towing mode as a mode for towing the towed vehicle with a high total height may be provided in the pickup truck 10, the switch serving as a switch for selecting a traveling mode. Thus, it may be determined that the total height of the towed vehicle is high when the towing mode is selected through the operation performed by the occupant.

Figure 7:
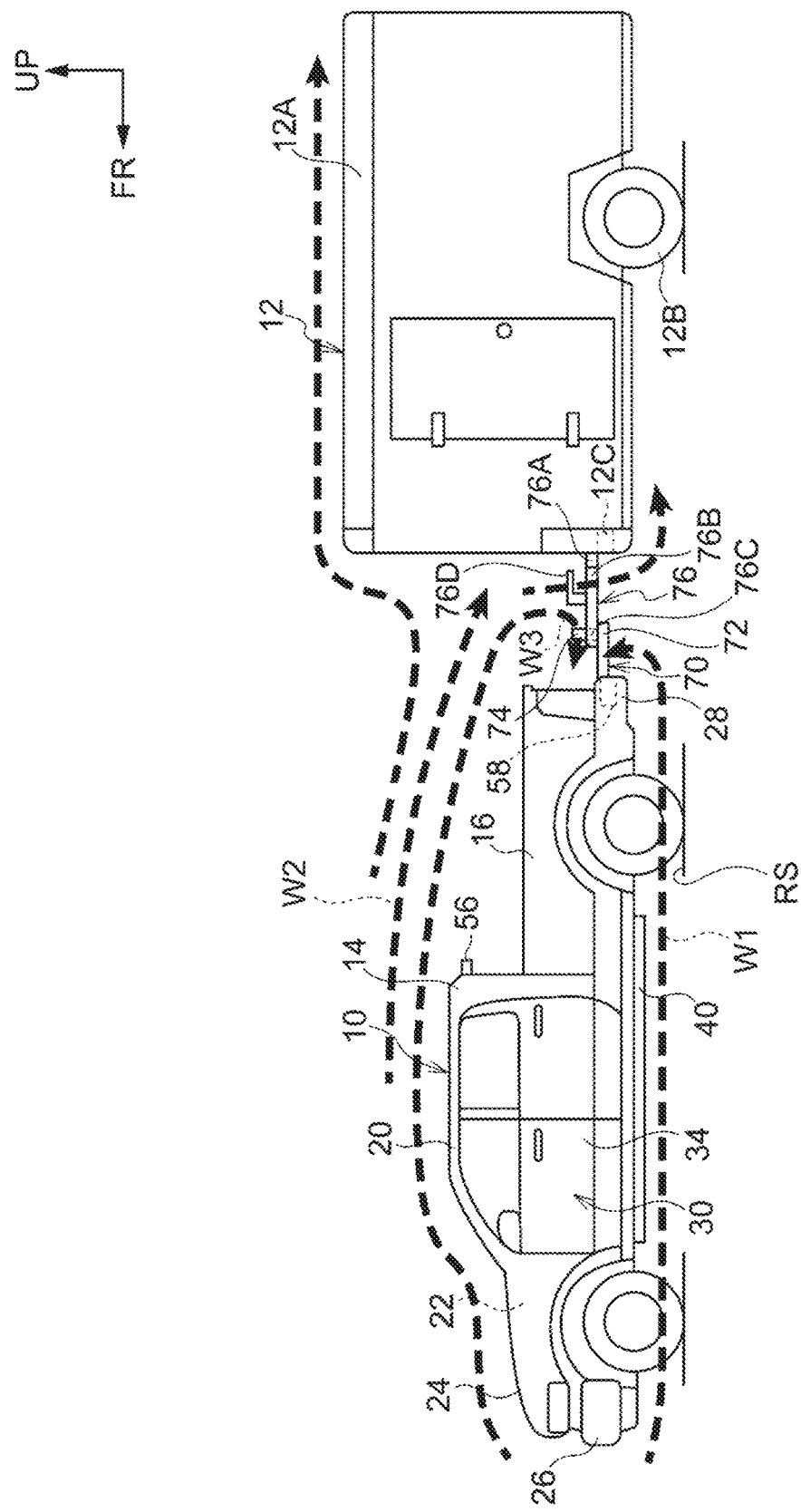
FIG. 7 is a lateral view showing the flows of air around the pickup truck that is provided with the vehicular aerodynamic device according to the first embodiment, and that tows the trailer.

In step 126, the ECU 80 controls the front spoiler device 60 to move the flare portion 62 to the retracted position. The ECU 80 controls the side step device 40 to move the step portion 50 to the retracted position. The front spoiler device 60 and the side step device 40 are thus brought to the retracted state, and thus, a traveling wind W1 is urged to flow into an area under the floor of the pickup truck 10 from between the lower end portion of the front bumper cover 26 and the road surface RS as shown in FIG. 7. The traveling wind W1 is also urged to flow into the area under the floor of the pickup truck 10 from between a lower end portion of the side step device 40 and the road surface RS.

The traveling wind W1 that has flowed into the area under the floor of the traveling pickup truck 10 flows out toward a rear side of the pickup truck 10 from the area under the floor of the rear portion of the pickup truck 10. On the other hand, a traveling wind W2 flowing above the roof panel 20 of the pickup truck 10 flows down toward the rear side of the pickup truck 10 along an upper surface of the pickup truck 10. A traveling wind W3, which is part of the traveling wind W2 that has flowed down toward the rear side of the pickup truck 10, collides with a front surface of the trailer 12 (the towed vehicle), and flows down toward the front side and the lower side of the pickup truck 10. The traveling wind W3 that has thus flowed down is pushed up toward the upper side by being hit by the traveling wind W1 that flows out toward the rear side of the pickup truck 10 from the area under the floor of the rear portion of the pickup truck 10. Part of the pushed-up air collides with a rear portion of the load-carrying platform 16 of the pickup truck 10. Thus, a pressure toward the front side is produced at the rear portion of the pickup truck 10, and thus, air resistance applied to the pickup truck 10 is reduced.

Figure 8:
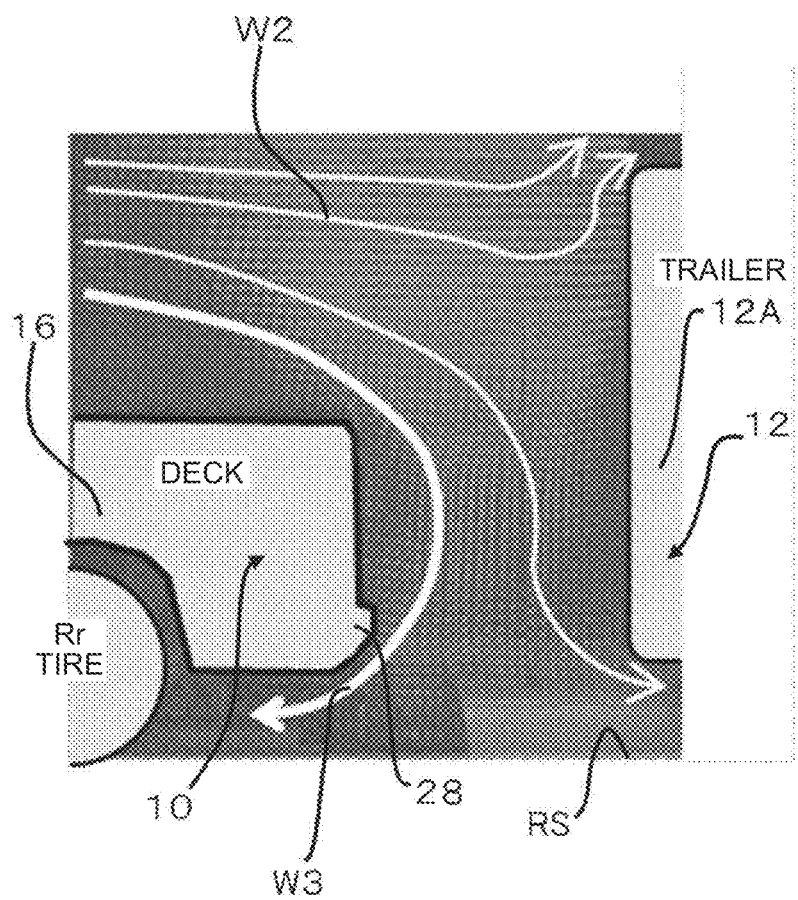
FIG. 8 is a lateral view showing the flows (streamlines) of air around a rear portion of the pickup truck in the case where the flow adjusting devices of the pickup truck according to the first embodiment are in a deployed state.

FIG. 8 shows the traveling winds (streamlines) W2 and W3 in the vehicle lateral view in the case where the front spoiler device 60 and the side step device 40 as flow adjusting devices are in the deployed state. The traveling winds W2 and W3 are visualized based on a measurement result of a wind-tunnel test. Part of the traveling wind W2 that has flowed down toward the rear side of the pickup truck 10 along the upper surface of the pickup truck 10 collides with the front surface of the trailer 12, and flows down toward the front side and the lower side of the pickup truck 10. Therefore, the traveling wind W3, which is the part of the traveling wind W2 that has flowed down, flows into the area under the floor of the pickup truck 10. Thus, the pressure due to the air toward the front side at the rear portion of the pickup truck 10 falls, and thus, the air resistance applied to the pickup truck 10 increases. Furthermore, a lift force toward the upper side is produced at the pickup truck 10, due to the air that has flowed into the area under the floor of the rear portion of the pickup truck 10. Therefore, the operating stability of the pickup truck 10 may decrease.

Figure 9:
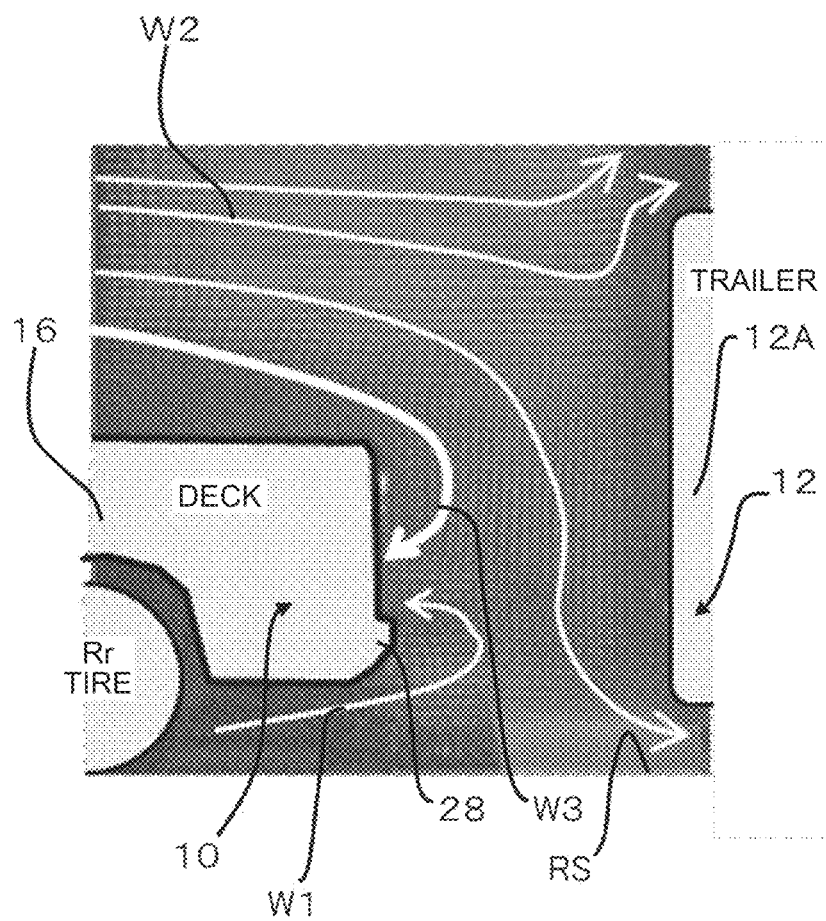
FIG. 9 is a lateral view showing the flows (streamlines) of air around the rear portion of the pickup truck in the case where the flow adjusting devices of the pickup truck according to the first embodiment are in a retracted state.

On the other hand, FIG. 9 shows the traveling winds (streamlines) W1, W2, and W3 in the vehicle lateral view in the case where the front spoiler device 60 and the side step device 40 are in the retracted state. Since the front spoiler device 60 and the side step device 40 are retracted, the traveling wind W1 is urged to flow into the area under the floor of the pickup truck 10 from between the lower end portion of the front bumper cover 26 and the road surface RS and from between the lower end portion of the side step device 40 and the road surface RS. Therefore, part of the traveling wind W2 that flows down toward the rear side of the pickup truck 10 along the upper surface of the pickup truck 10, that is, the traveling wind W3 that has flowed down toward the front side and the lower side of the pickup truck 10 after colliding with the front surface of the trailer 12 is pushed up toward the upper side by the traveling wind W1 that flows out toward the rear side of the pickup truck 10 from the area under the floor of the rear portion of the pickup truck 10. Thus, the pressure due to the air toward the front side at the rear portion of the pickup truck 10 increases, and thus, the air resistance applied to the pickup truck 10 is reduced. Furthermore, a lift force is not produced at the rear portion of the pickup truck 10, and thus, the operating stability of the pickup truck 10 can be ensured. The effect, that is, the increase in pressure due to the air toward the front side at the rear portion of the pickup truck 10 has been confirmed by measuring the pressure with the use of a pressure sensor (not shown) that is attached to the rear portion of the pickup truck 10 in the wind-tunnel test shown in FIGS. 8 and 9.

Figure 6:
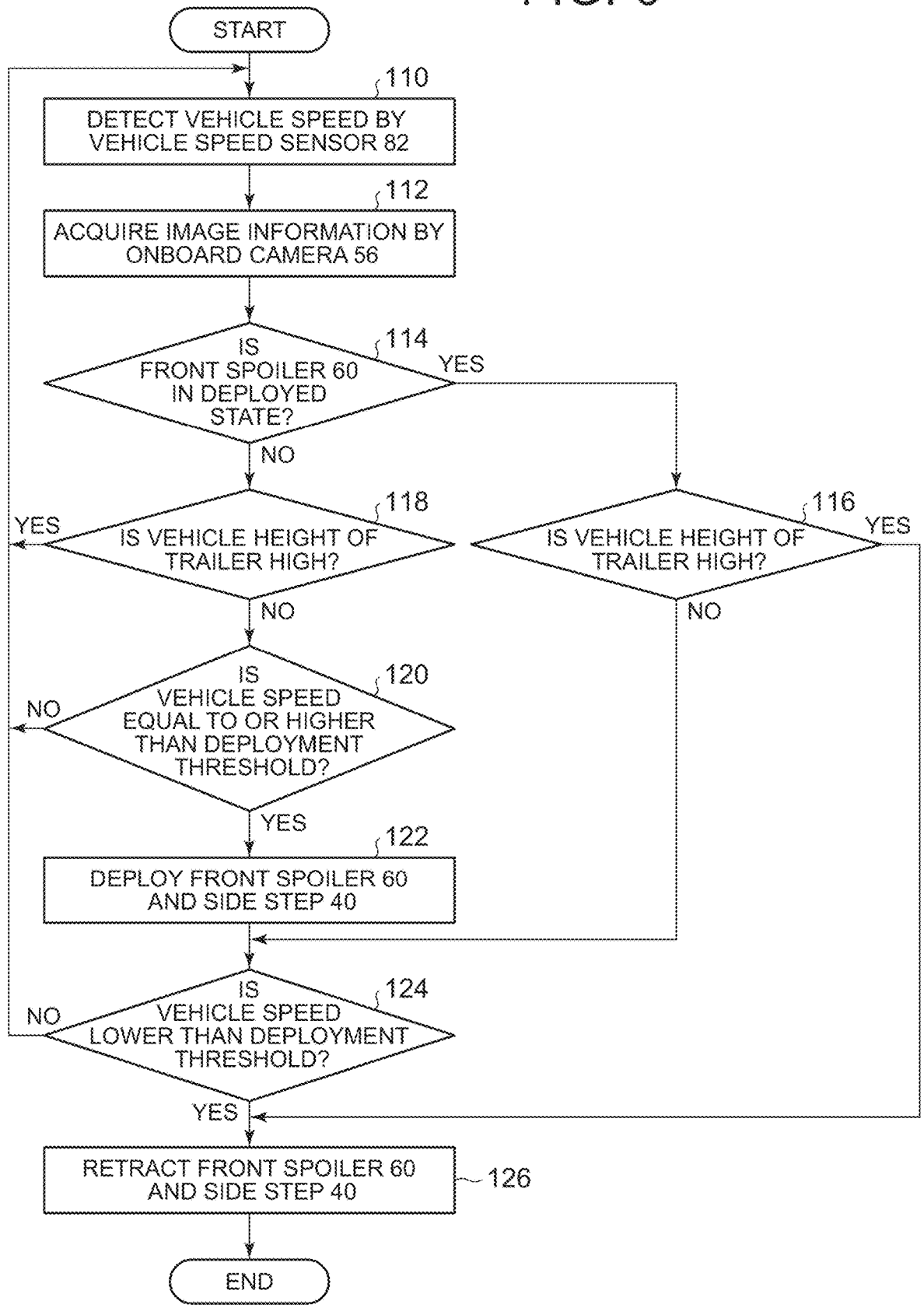
FIG. 6 is a flowchart for controlling the vehicular aerodynamic device according to the first embodiment by a flow adjusting device control unit.

As shown in FIG. 6, in step 118 where the front spoiler device 60 and the side step device 40 are in the retracted state, it is determined whether the total height of the trailer 12 is high, as is the case with step 116. The ECU 80 determines whether the pickup truck 10 is towing a towed vehicle with a high total height, is towing a towed vehicle with a relatively low total height, or is in the single traveling state without towing any towed vehicle. When it is determined that the pickup truck 10 is towing the trailer 12 with a high total height, the control shifts to step 110. On the other hand, when it is determined that the pickup truck 10 is towing the towed vehicle with a relatively low total height or is in the single traveling state, the control shifts to step 120.

In step 120, the ECU 80 determines whether the vehicle speed of the pickup truck 10 detected by the vehicle speed sensor 82 is equal to or higher than a threshold (hereinafter referred to as "a deployment threshold") at or above which the front spoiler device 60 and the side step device 40 are brought to the deployed state. When the vehicle speed of the pickup truck 10 is equal to or higher than the deployment threshold, the control shifts to step 122. On the other hand, when the vehicle speed of the pickup truck 10 is lower than the deployment threshold, the control shifts to step 110.

In step 122, the ECU 80 controls the front spoiler device 60 such that the front spoiler device 60 is brought to the deployed state, and controls the side step device 40 such that the side step device 40 is brought to the deployed state.

Figure 10:
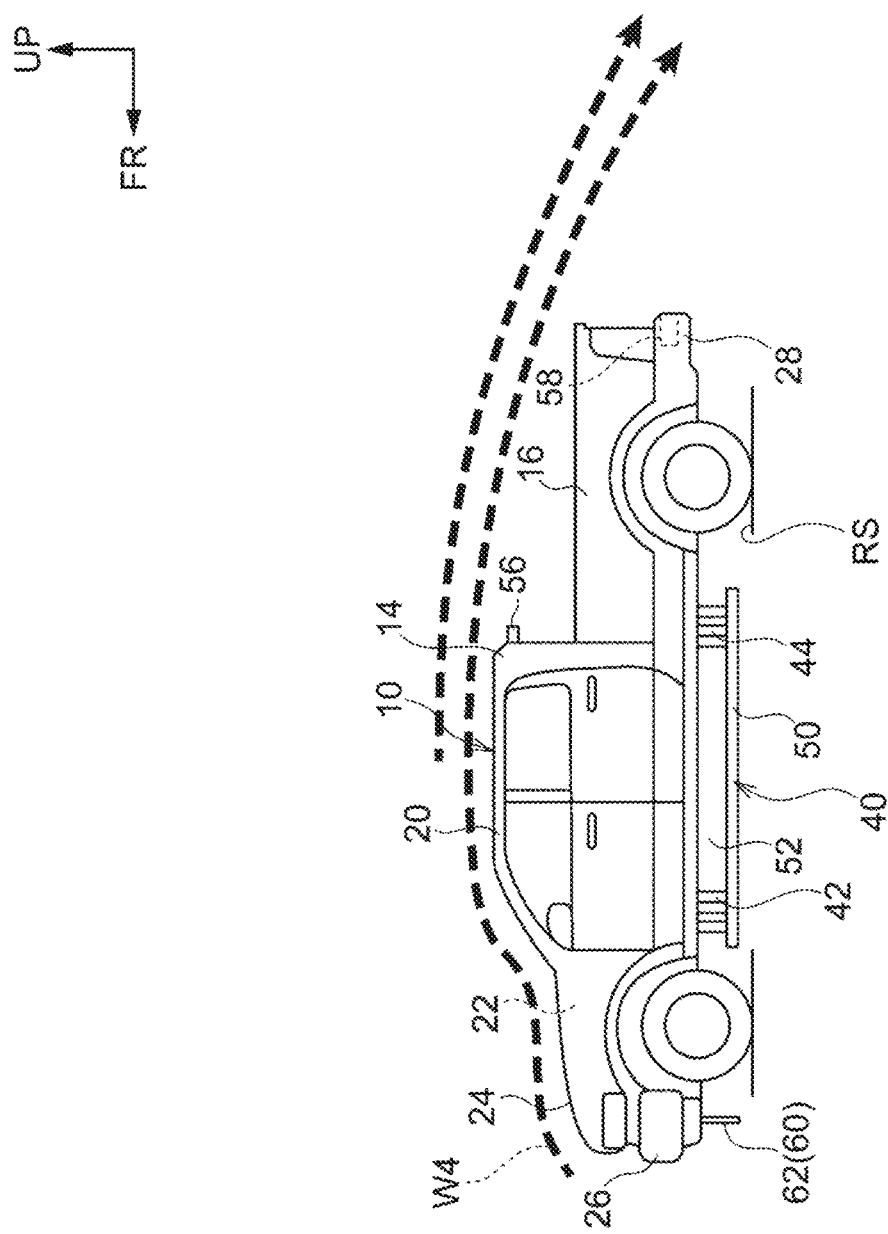
FIG. 10 is a lateral view showing the flows of air around the pickup truck that is provided with the vehicular aerodynamic device according to the first embodiment, the pickup truck traveling alone.

At the time of traveling at high speed, the traveling wind flowing into the area under the floor of the pickup truck 10 from between the lower end portion of the front bumper cover 26 and the road surface RS and from between the lower end portion of the side step device 40 and the road surface RS is likely to produce a swirl from the lower end portion of the pickup truck 10. The air resistance applied to the pickup truck 10 may increase due to the production of the swirl in this manner. Therefore, at the time of traveling at high speed, the front spoiler device 60 and the side step device 40 are brought to the deployed state as shown in FIG. 10. Thus, a traveling wind W4 is restrained from flowing into the area under the floor of the pickup truck 10, and thus, the swirl is restrained from being produced at the lower end portion of the pickup truck 10.

The traveling wind W4 that has hit the flare portion 62 in the deployed state flows down in the vehicle width direction along the flare portion 62 without flowing into the area under the floor of the pickup truck 10, and flows down toward the rear side from the lateral portion of the pickup truck 10. The traveling wind W4 that has hit the lateral wall portion 52 in the deployed state flows down toward the rear side along the lateral wall portion 52. Thus, the flow of the traveling wind W4 around the pickup truck 10 can be adjusted and the swirl can be restrained from being produced, and further, the air resistance applied to the pickup truck 10 can be reduced.

The pickup truck 10 may decelerate in accordance with a deterioration in road conditions or the like. In such a case, the control shifts to step 124. In step 124, the ECU 80 determines whether the vehicle speed of the pickup truck 10 has decreased to a speed lower than the deployment threshold. When it is determined that the vehicle speed is equal to or higher than the deployment threshold, the control shifts to step 110. On the other hand, when it is determined that the vehicle is lower than the deployment threshold, the control shifts to step 126.

In step 126, the ECU 80 controls the front spoiler device 60 to move the flare portion 62 to the retracted position. The ECU 80 controls the side step device 40 to move the step portion 50 to the retracted position. Thus, the traveling wind W1 (see FIG. 7) is urged to flow into the area under the floor of the pickup truck 10 from between the lower end portion of the front bumper cover 26 and the road surface RS and from between the lower end portion of the side step device 40 and the road surface RS.

The vehicular aerodynamic device according to the present embodiment makes it possible to reduce the air resistance applied to the pickup truck 10 when the pickup truck 10 travels alone, and to reduce the air resistance applied to the pickup truck 10 also when the pickup truck 10 tows the trailer 12.

Next, a vehicular aerodynamic device according to a second embodiment of the disclosure will be described with the use of FIGS. 11 and 12. Components identical to those of the foregoing first embodiment are denoted by the same reference numerals respectively, and the description thereof will be omitted.

Figure 11:
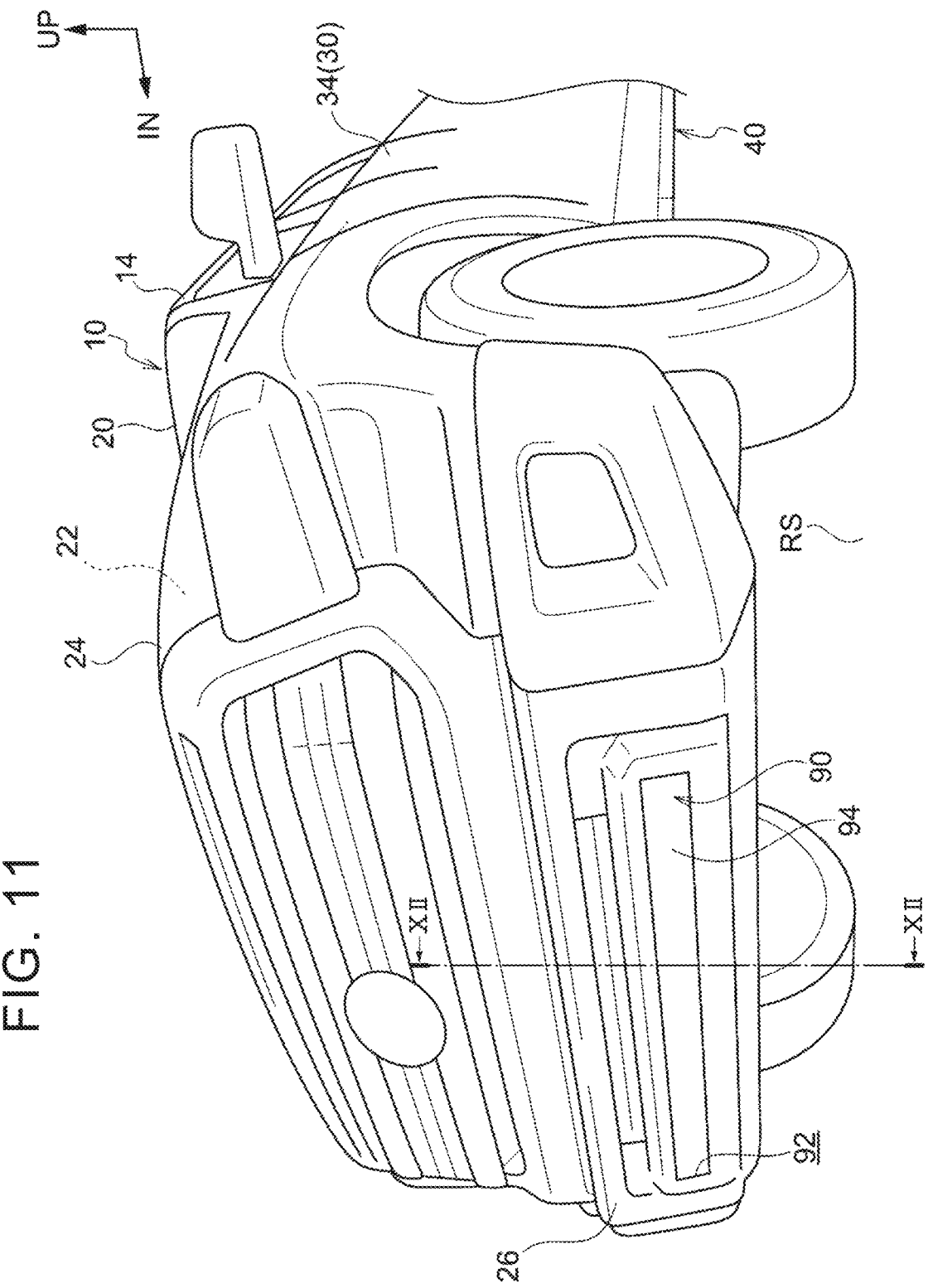
FIG. 11 is a perspective view of a grille shutter device as a flow adjusting device according to a second embodiment as viewed from the vehicle front side.

As shown in FIG. 11, in the vehicular aerodynamic device according to the present embodiment, a grille shutter device 90 as a flow adjusting device is provided, instead of the front spoiler device 60, at the front portion of the pickup truck 10. The grille shutter device 90 is disposed behind the front bumper cover 26 of the pickup truck 10.

An opening portion 92 is provided in the lower side of the front bumper cover 26. The opening portion 92 extends along the vehicle width direction and is opened forward (i.e., opened toward the front side). A shutter portion 94 as a flow adjusting member is disposed behind the opening portion 92. The shutter portion 94 can move between a deployed position (a position indicated by a solid line in FIG. 12) for closing the opening portion 92 from the inner side of the pickup truck 10 and a retracted position (a position indicated by an alternate long and two short dashes line in FIG. 12) behind the opening portion 92. One end portion of a shutter link portion 96 is coupled to a rear side of the shutter portion 94. The other end portion of the shutter link portion 96 is turnably attached to a rotary shaft of an actuator (not shown) that is disposed behind the shutter link portion 96. That is, the other end portion of the shutter link portion 96 is attached to the rotary shaft of the actuator (not shown) such that the other end portion can be turned.

Figure 12:
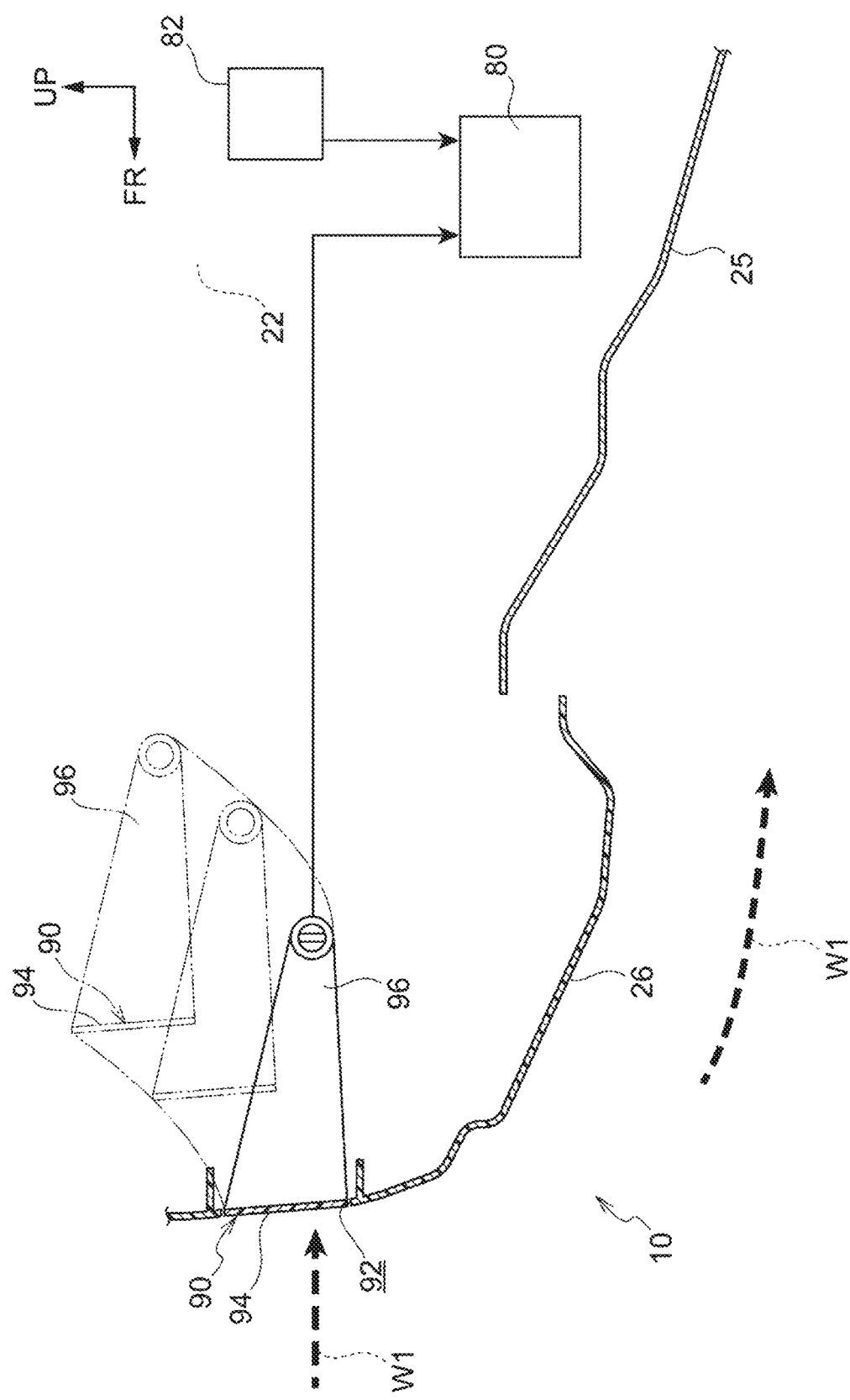
FIG. 12 is a vertical sectional view showing a state where the grille shutter device shown in FIG. 11 is cut along a line XII-XII of FIG. 11.

As shown in FIG. 12, according to the present embodiment, when the grille shutter device 90 and the side step device 40 are retracted, the traveling wind W1 is urged to flow into the area under the floor of the pickup truck 10 from the opening portion 92 and to flow into the area under the floor of the pickup truck 10 from between the lower end portion of the side step device 40 and the road surface RS, as well as from between the lower end portion of the front bumper cover 26 and the road surface RS (see FIG. 7). Therefore, the traveling wind W3 (see FIG. 7), which has flowed down toward the rear side of the pickup truck 10 along the upper surface of the pickup truck 10, has collided with the front surface of the trailer 12, and has flowed down toward the front side and the lower side of the pickup truck 10, is pushed up toward the upper side by the traveling wind W1 that flows out toward the rear side of the pickup truck 10 from the area under the floor of the rear portion of the pickup truck 10. Thus, even in the case where the pickup truck 10 tows the trailer 12, the pressure due to the air toward the front side at the rear portion of the pickup truck 10 increases, and thus, the air resistance applied to the pickup truck 10 is reduced. Furthermore, a lift force is not produced at the rear portion of the pickup truck 10, and thus, the operating stability of the pickup truck 10 can be ensured.

The vehicular aerodynamic device according to the present embodiment makes it possible to reduce the air resistance applied to the pickup truck 10 when the pickup truck 10 travels alone, and to reduce the air resistance applied to the pickup truck 10 also when the pickup truck 10 tows the trailer 12.

What is claimed is:

1. A vehicular aerodynamic device comprising:
   a towing detection unit that is provided in a vehicle configured to tow a towed vehicle, the towing detection unit being configured to detect whether the towed vehicle is being towed by the vehicle;
   a flow adjusting device that is provided on a lower side of the vehicle, and includes a flow adjusting member, the flow adjusting device being configured such that the flow adjusting member is moved between a retracted position where the flow adjusting member is retracted toward an inner side of the vehicle and a deployed position where the flow adjusting member is deployed toward an outer side of the vehicle, wherein the flow adjusting device comprises at least one of a front spoiler device, a side step device or a grille shutter device; and
   a flow adjusting device control unit configured to i) determine whether the towing detection unit detects that the towed vehicle is being towed, ii) determine a kind of the towed vehicle, and iii) control operation of the flow adjusting device in accordance with the determined kind of the towed vehicle or a traveling mode selected through operation performed by an occupant in the vehicle.

2. The vehicular aerodynamic device according to claim 1, wherein the flow adjusting device control unit is configured to control the operation of the flow adjusting device in accordance with a vehicle speed of the vehicle.

3. A vehicular aerodynamic device comprising:
   a towing detection unit that is provided in a vehicle configured to tow a towed vehicle, the towing detection unit being configured to detect whether the towed vehicle is being towed by the vehicle;
   a flow adjusting device that is provided on a lower side of the vehicle, and includes a flow adjusting member, the flow adjusting device being configured such that the flow adjusting member is moved between a retracted position where the flow adjusting member is retracted toward an inner side of the vehicle and a deployed position where the flow adjusting member is deployed toward an outer side of the vehicle; and
   a flow adjusting device control unit configured to i) determine whether the towing detection unit detects that the towed vehicle is being towed, ii) determine a kind of the towed vehicle, and iii) control operation of the flow adjusting device in accordance with the determined kind of the towed vehicle or a traveling mode selected through operation performed by an occupant in the vehicle, wherein
   the flow adjusting device includes a front spoiler device that is disposed on a lower side of a front portion of the vehicle, and
   the front spoiler device includes:
      a spoiler link portion having one end portion that is turnably attached to the vehicle;
      a stay portion disposed such that a longitudinal direction of the stay portion is a vehicle width direction, the stay portion being attached to another end portion of the spoiler link portion, and the stay portion being provided to extend along the vehicle width direction; and
      a flare portion that serves as the flow adjusting member and is attached to the stay portion along the longitudinal direction of the stay portion, the flare portion being in a form of a substantially flat plate disposed to extend along a vehicle up-down direction in a vehicle front view between a lower end portion of a front bumper cover of the vehicle in the vehicle up-down direction and a road surface when the flare portion is in a deployed state.

4. A vehicular aerodynamic device comprising:
   a towing detection unit that is provided in a vehicle configured to tow a towed vehicle, the towing detection unit being configured to detect whether the towed vehicle is being towed by the vehicle;
   a flow adjusting device that is provided on a lower side of the vehicle, and includes a flow adjusting member, the flow adjusting device being configured such that the flow adjusting member is moved between a retracted position where the flow adjusting member is retracted toward an inner side of the vehicle and a deployed position where the flow adjusting member is deployed toward an outer side of the vehicle; and
   a flow adjusting device control unit configured to i) determine whether the towing detection unit detects that the towed vehicle is being towed, ii) determine a kind of the towed vehicle, and iii) control operation of the flow adjusting device in accordance with the determined kind of the towed vehicle or a traveling mode selected through operation performed by an occupant in the vehicle, wherein
   the flow adjusting device includes a side step device that is disposed to extend along a vehicle front-rear direction on a lower side of a lateral portion of the vehicle, and
   the side step device includes:
      a front link portion disposed such that a longitudinal direction of the front link portion is a vehicle width direction, the front link portion being provided to extend along the vehicle width direction in a front side of the vehicle, and the front link portion having one end portion that is turnably attached to the lateral portion of the vehicle;
      a rear link portion disposed such that a longitudinal direction of the rear link portion is the vehicle width direction, the rear link portion being provided to extend along the vehicle width direction in a rear side of the vehicle, and the rear link portion having one end portion that is turnably attached to the lateral portion of the vehicle;
      a step portion that is provided to extend along the vehicle front-rear direction, the step portion being attached to another end portion of the front link portion and another end portion of the rear link portion, and the step portion being configured to be raised and lowered in a vehicle up-down direction; and
      a lateral wall portion that serves as the flow adjusting member and is provided between a rear side of the front link portion in the vehicle front-rear direction and a front side of the rear link portion in the vehicle front-rear direction, the lateral wall portion being disposed to extend along the vehicle up-down direction in a vehicle lateral view between the lateral portion of the vehicle and the step portion when the lateral wall portion is in a deployed state.

5. The vehicular aerodynamic device according to claim 1, wherein
   the flow adjusting device includes an opening portion that is provided to extend along a vehicle width direction in a lower side of a front bumper cover of the vehicle in a vehicle up-down direction, the opening portion being opened toward a front side of the vehicle, and the flow adjusting device further includes the grille shutter device that is disposed behind the front bumper cover of the vehicle in a vehicle front-rear direction, and
the grille shutter device includes:
- a shutter portion that serves as the flow adjusting member, the shutter portion being disposed behind the opening portion in the vehicle front-rear direction and extending along the vehicle up-down direction in a vehicle front view so as to close the opening portion when the shutter portion is in a deployed state; and
- a shutter link portion having one end portion that is coupled to the shutter portion, and having another end portion that is turnably attached to the vehicle.

6. The vehicular aerodynamic device according to claim 1, wherein the flow adjusting device comprises the side step device.

7. The vehicular aerodynamic device according to claim 6, wherein the flow adjusting device further comprises the front spoiler device.

8. The vehicular aerodynamic device according to claim 6, wherein the flow adjusting device further comprises the grille shutter device.

9. The vehicular aerodynamic device according to claim 1, wherein the flow adjusting device control unit is configured to detect information about the towed vehicle using an onboard camera.

10. The vehicular aerodynamic device according to claim 1, wherein the flow adjusting control unit is further configured to control the flow adjusting device based on a height of the towed vehicle.

11. The vehicular aerodynamic device according to claim 1, wherein the flow adjusting device comprises the front spoiler device and the side step device, and the flow adjusting device control unit is configured to deploy the front spoiler device and the side step device independently.

12. The vehicular aerodynamic device according to claim 3, wherein the flow adjusting device control unit is configured to control the operation of the flow adjusting device in accordance with a vehicle speed of the vehicle.

13. The vehicular aerodynamic device according to claim 3, wherein the flow adjusting device further comprises a side step device.

14. The vehicular aerodynamic device according to claim 13, wherein the flow adjusting device comprises the front spoiler device and the side step device, and the flow adjusting device control unit is configured to deploy the front spoiler device and the side step device independently.

15. The vehicular aerodynamic device according to claim 3, wherein the flow adjusting device control unit is configured to detect information about the towed vehicle using an onboard camera.

16. The vehicular aerodynamic device according to claim 3, wherein the flow adjusting control unit is further configured to control the flow adjusting device based on a height of the towed vehicle.

17. The vehicular aerodynamic device according to claim 4, wherein the flow adjusting device control unit is configured to control the operation of the flow adjusting device in accordance with a vehicle speed of the vehicle.

18. The vehicular aerodynamic device according to claim 4, wherein the flow adjusting device further comprises a front spoiler device.

19. The vehicular aerodynamic device according to claim 18, wherein the flow adjusting device comprises the front spoiler device and the side step device, and the flow adjusting device control unit is configured to deploy the front spoiler device and the side step device independently.

20. The vehicular aerodynamic device according to claim 4, wherein the flow adjusting control unit is further configured to control the flow adjusting device based on a height of the towed vehicle.

* * * * *